Patented Nov. 28, 1950

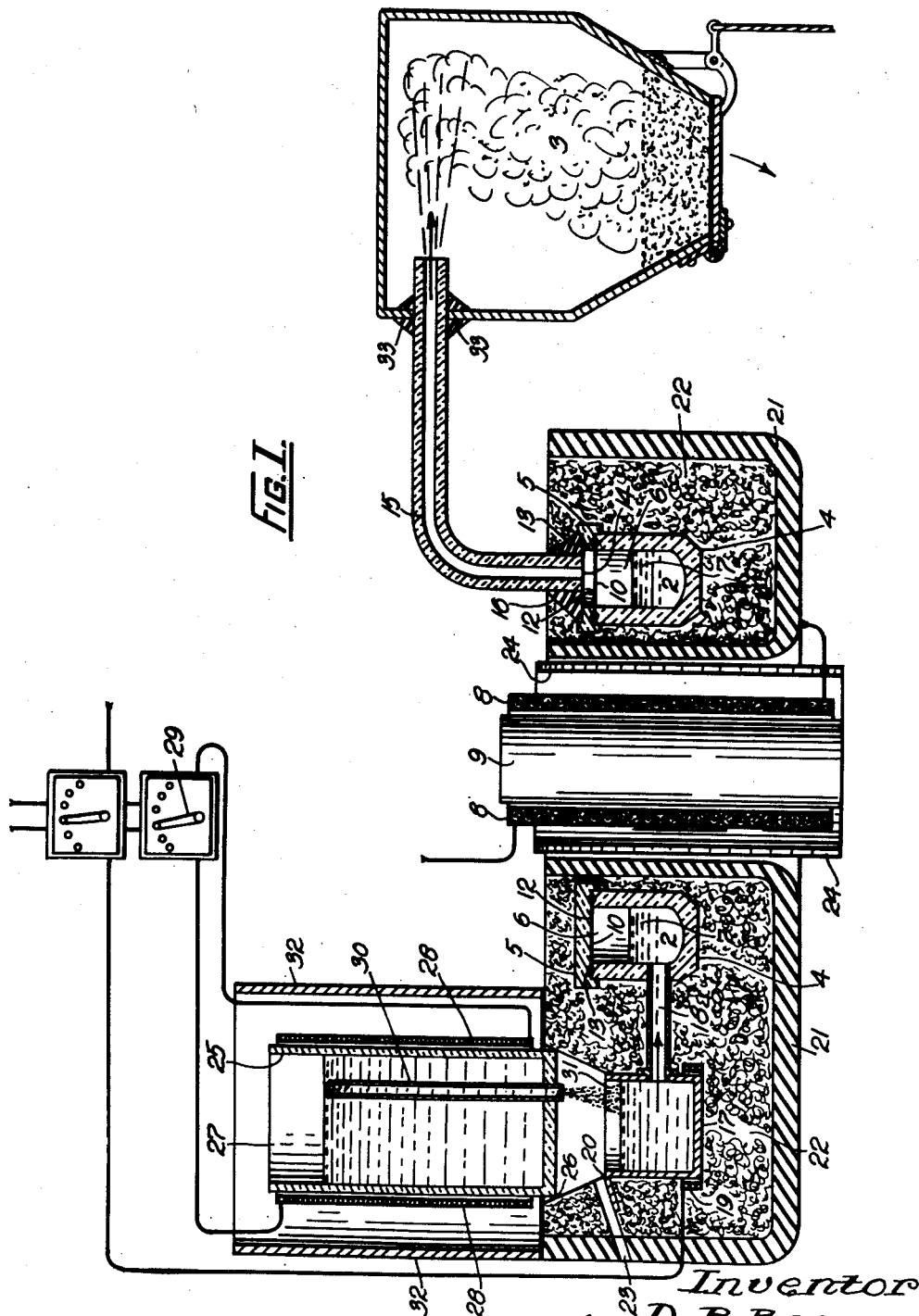

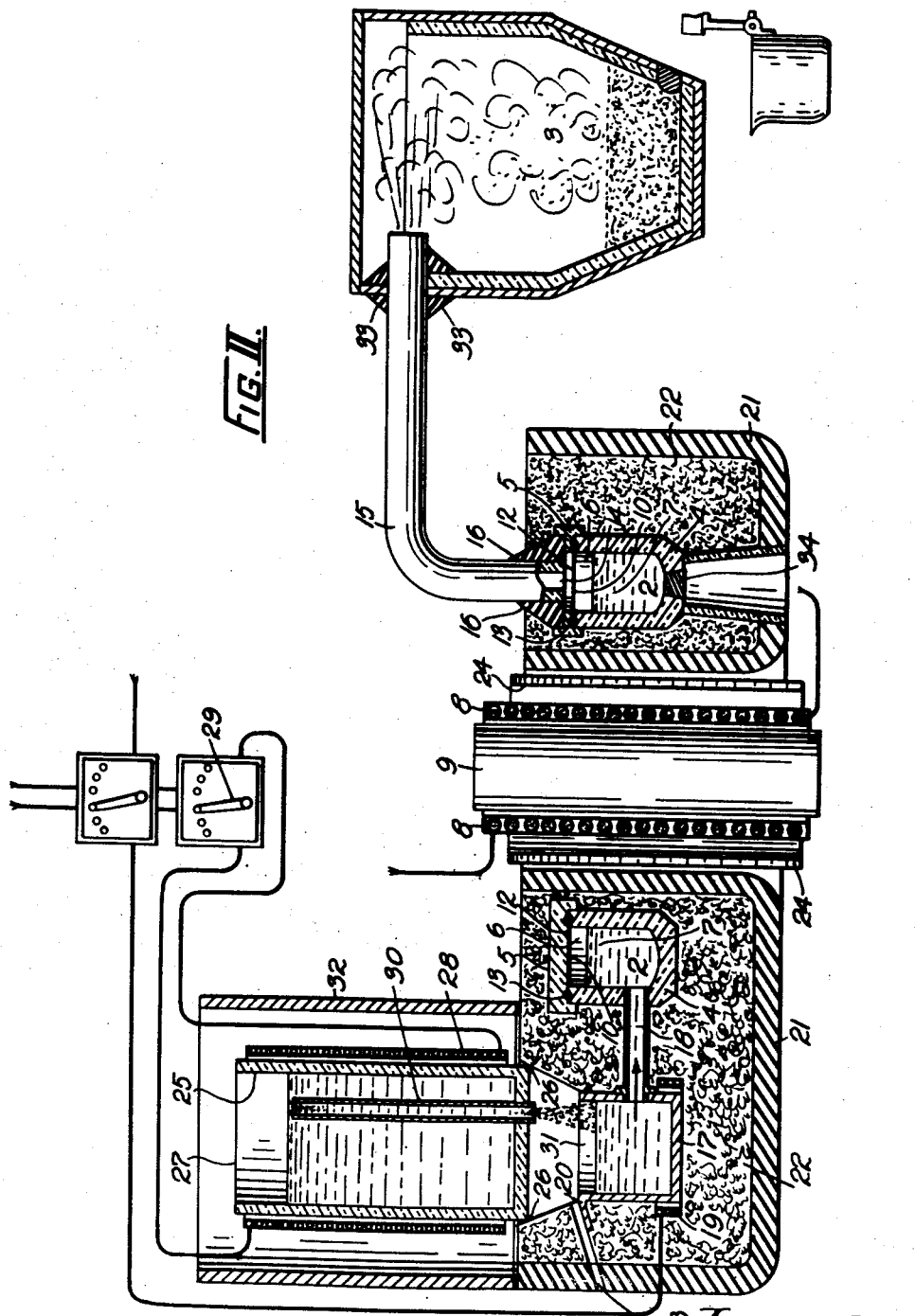

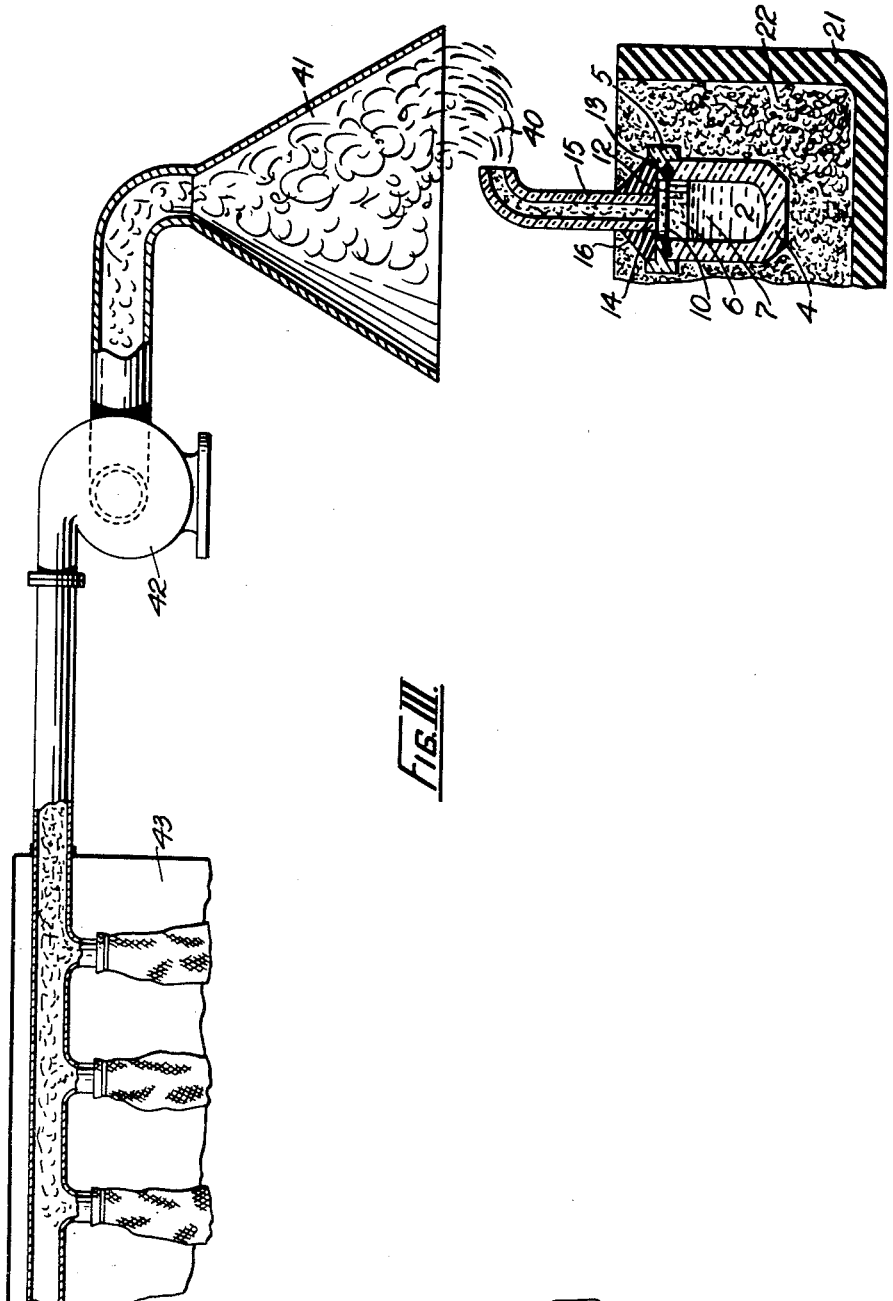

2,531,964

UNITED STATES PATENT OFFICE 2,531,964

ELECTRIC METALLURGICAL APPARATUS

David R. Bean, Greenside, Johannesburg, Transvaal, Union of South Africa, assignor to Anglo American Corporation of South Africa Limited, Johannesburg, Transvaal, Union of South Africa Application February 28, 1949, Serial No. 78,742
In the Union of South Africa March 24, 1948

5 Claims. (Cl. 13—5)

This invention relates to apparatus for carrying out metallurgical processes that include the vaporisation by heat of metals and materials, the boiling temperature of which at atmospheric pressure is of the same order as that of zinc, cadmium, arsenic and antimony; or say temperatures between 400° to 1500° C.

The invention has utility in the treatment of zinc by vaporising it and converting the vapour into an industrial product. In that connection an object is to provide apparatus for carrying out the process continuously as compared with the presently practised batch operation. Another object is to do away with the uncomfortably hot conditions under which the attendants work the present apparatus for this purpose. Another object is to improve on the poor thermal efficiency of the present process. Another object is to simplify the control of the process when that includes condensation of the vaporised product.

The invention comprises the combination of an induction furnace having a furnace chamber providing an enclosed annular furnace cavity disposed with its axis vertical, and heating means disposed axially with respect to the cavity and suitable to heat the contents of the cavity inductively, vapour treatment apparatus adapted to convert vaporous material into an industrial product, a conduit connecting the upper part of the cavity with the treatment apparatus; the furnace chamber being sufficiently fluid-tight to withstand the internal pressure necessary to drive matter in the gaseous phase from the cavity into the treatment apparatus; a feed vessel suitable to hold material in the liquid phase, a passage connecting the vessel with the furnace cavity and positioned to communicate with each at a low level which is below the level of their liquid content; a melting pot suitable to receive solid material and electrical heating means associated with the pot to convert the material in it to liquid phase and having discharge means above the feed vessel for material melted therein to flow gravitationally into the feed vessel.

The fluid-tightness of the chamber ensures that vapour does not escape from its otherwise than through the conduit and also that air from the atmosphere does not pass into the cavity through the chamber walls and joints therein.

A further characteristic of the furnace chamber is that it is made of refractory ceramic ware that is resistant to active corrosion or erosion by the boiling contents of the furnace. The necessary degree of fluid-tightness between the body of the chamber and the lid is attained by luting.

In some forms of the invention the treatment apparatus is a condenser which condenses the vapour evolved from the furnace and in that event the joint presence of the condenser and the above-mentioned means for melting the raw material at a controlled rate constitutes a controllable means for determining the physical state and/or quality of the end product.

Such physical state and/or quality of the condenser product depends upon the condenser temperature. That is to say, that a lower temperature is required in the case of a solid condenser product as compared with a molten condenser product, and in the manufacture of zinc dust the quality of the product and the efficiency of the process depend on regulation of the condenser temperature.

The condenser temperature is controlled by regulation of the quantitative relationship between the heat dispersing capacity of the condenser and the heat input to the condenser; so that for instance increasing the heat input to the condenser without equally increasing the heat dispersing capacity, results in a rise of the condenser temperature until a fresh state of equilibrium is attained due to the increasing internal condenser temperature causing the heat outflow to become equal to the increased heat input.

It is as a rule convenient to have the heat exchanging area of the condenser substantially constant, and to have the cooling fluid, e. g. air, flowing over the heat exchanging surface at about constant temperature or as constant as it naturally occurs. Hence to obtain a desired steady condenser temperature the heat input to the condenser must be kept steady. This heat input is readily controlled by increasing or decreasing the rate of melting and feeding the raw material.

The provision of the induction furnace considerably facilitates this last mentioned method of heat control, since the input of energy to heat the furnace contents varies automatically with the cross section of the furnace charge. Such cross section, in turn, varies according to the rate of feeding fresh material to the furnace cavity; and according to the invention the rate of feeding the furnace is controlled and thereby the rate of distillation and consequently the rate of heat input to the condenser are consequentially and correspondingly changed automatically.

When, as in the examples hereinafter described, the fresh material is melted as a separate step before being fed to the furnace cavity, the rate of feeding the furnace is governed by the rate at which material is melted in the pot and passed on to the furnace cavity. The condenser temperature is thus adjusted by varying the rate at which solid material is fed to the melting pot, with corresponding adjustment of the heat supply to the pot: the furnace itself automatically making the adjustment of the heat energy required for distillation.

Three specific forms of the vapour treatment apparatus are contemplated; one being for carrying out the ordinary process for producing zinc dust by condensing the vapour within an air-cooled condenser that is held at the temperature proper for that purpose and which may be filled with inert gas. Control of the rate of melting gives effective control of the condenser temperature.

A second form is for converting the vaporised metal to the solid state after its vapour has been produced by preferential vaporisation from a mixture or alloy of metals in the furnace. In that case the vapour treatment apparatus comprises a condenser held at the temperature necessary to condense the vapour to molten metal in the condenser, together with means for withdrawing the molten metal from the condenser and so dealing with it that it may be cast and solidified in a form convenient for re-use. The furnace chamber in this case is formed with an outlet for gravitationally draining the less volatile constituents left in a liquid state after the more volatile constituents have passed out as vapour through the conduit; the outlet being fitted with a removable closure.

Another specific form of the vapour treatment apparatus is the usual apparatus for manufacturing an oxide of the vapour metal; comprising a burner to which vapour is fed by the conduit to be burned in the atmosphere, and means for collecting the resultant oxide.

The accompanying drawings show several forms of the invention in sectional elevation, Figure I being a sectional elevation of apparatus for the manufacture of zinc dust, Figure II shows apparatus generally similar to Figure I, but modified for separately recovering the constituents of a metallic alloy, one constituent of which is more volatile than the other, and Figure III shows part of the Figure I apparatus modified for the production of zinc oxide.

Referring to Figure I, the furnace portion of the apparatus is indicated generally by 2, and the vapour treatment portion by 3.

The furnace chamber comprises the body 4 and the lid 5 enclosing the annular furnace cavity 6 in which the zinc charge 7 forms the single-turn secondary of a transformer. The primary of the transformer is indicated by 8 and the core by 9. The number of active turns on the primary winding may be adjusted by ordinary tapping switches (not shown) and the alternating voltage supplied from the mains to the active turns may also be adjusted by ordinary means.

The chamber body 4 is a hollow annulus made of heat-refractory ceramic material, with jointing surface 10. The lid 5 is an annulus also made of heat resisting ceramic material with jointing surfaces 12 corresponding to the jointing surfaces 10 on the body 4. A fluid-tight joint is made between the jointing surfaces 10 and 12 by means of luting 13.

A socket 14 is formed in the lid for receiving the vapour conduit 15 which is secured and jointed fluid-tightly to the lid by luting 16. The conduit 15 is made of refractory material.

17 is a vessel made of metal or refractory material to hold molten zinc for feeding the cavity 6. The interior of the vessel 17 is in free communication with the furnace cavity 6 by means of a refractory pipe 18; enabling molten zinc to flow freely from the vessel to the cavity. The pipe 18 is below the common level in both the vessel 17 and the furnace cavity 6, so that the molten zinc passes through it without allowing air to pass through at the same time. The vessel 17 is provided with an electrical heater 19 for maintaining its contents in the molten state. It is further fitted with an overflow lip 20 to prevent overcharging of the furnace cavity 6.

The assembly consisting of the furnace 2, the conduit 18 and the feed vessel 17 is positioned in a larger casing 21 of material of high electrical resistance and is there packed in a mass of heat insulating material 22. The heat originating in the zinc in the cavity is thereby confined and has little opportunity to escape; thus promoting thermal efficiency and comfortable working conditions around the furnace. An outlet channel 23 is formed through the body of insulating material to lead away molten zinc discharged from the overflow lip 20. A heat insulating shield is positioned to protect the winding 8 and the core 9 against heat from the furnace; the shield being shown as a water jacket 24.

A zinc melting pot 25 is suspended in a socket 26 formed in the insulating material to receive it. The pot has an open mouth 27 large enough for the original zinc material, such as electrolytic slabs, to be easily fed into it. The pot is heated to the temperature necessary to melt its contents by an electrical heating coil 28, having a control 29 enabling the input of electrical energy and correspondingly the rate of melting to be varied. The pot is provided with an internal overflow pipe 30 through which molten zinc from the upper part of the pot flows down and is received into the open mouth 31 of the feed vessel 17 beneath it. A tubular heat baffle 32 surrounds the melting pot and the joint between the tube 32 and the heat-insulating mass 22 below it is luted. The space between the tube 32 and the melting pot 25 is filled with heat-insulating material.

The suspended melting pot 25 assembled with the surrounding heat insulator 32 may be arranged to be readily lifted to allow access to the feed vessel 17 for the occasional removal of dross. After the dross is removed, the pot is lowered into the normal place and the joint is luted again.

The conduit 15 is continued into the condenser 3 and jointed thereto by luting 33. The condenser shown is of a type suitable for making zinc dust. It consists of an air cooled metal box, the heat-exchanging area of which is substantially constant.

In the operation of the apparatus solid zinc is melted in the pot 25 and flows into and through the feed vessel 17 to form a metallic ring 7 in the furnace chamber 2.

The primary coil 8 being energised, an electric current of low voltage and high amperage is thereby induced in the ring 7; causing the metal composing it to volatilise and pass to the condenser, and condense therein.

The condenser having been designed to attain the temperature proper for the condensation of the zinc vapour to zinc dust, with a given average rate of output of vapour from the furnace, the more precise attainment of that temperature is achieved by adjustment of the rate of melting of solid zinc in the melting pot, and of the heat energy supplied to melt the zinc so supplied which is obtained by adjustment of the rate at which electric heat energy is supplied to the pot, as explained above.

Adjustment of the number of active turns on the primary winding 8 is used principally to correct variations that may occur in the supply voltage and to compensate for variations in the resistance of the furnace. For instance, in starting the furnace from cold the resistance is low and the transformer tappings are used to supply a correspondingly lower voltage. Again, during the operation of the furnace, impurities are apt to accumulate in the charge within the furnace chamber and alter its resistance, whereupon the effective secondary voltage of the transformer is altered correspondingly to maintain the normal rate of distillation.

Figure II shows apparatus suitable for separately recovering the constituents of a metallic mixture, which constituents boil at substantially different temperatures (and which apparatus is suitable for instance for separately recovering the zinc and the silver from a zinc-silver alloy which is a product of the Parkes process for removing silver from lead). A removable plug 34 is provided in the base of the furnace cavity 6. A conduit 15 delivers the zinc vapour to structure 3 which recovers it in any desired form by known means. In the operation of this form of the invention the alloy is fed to the melting pot 25 and passes therefrom in liquid form to the furnace cavity 6. There it is subjected to a temperature at which the zinc boils but at which the silver remains liquid, thus effecting the separation required.

A batch is treated in this way until the whole or a large proportion of the more volatile constituents is evaporated leaving the less volatile constituents, including the silver, in the furnace cavity in a molten state. The plug 34 is then removed and liquid contents of the cavity are run out.

The apparatus shown in Figure III does not include a condenser. Vapour issuing from the conduit 15 is burnt in the open air as shown at 40. The resulting oxide is collected by the funnel 41 and the fan 42 and recovered in a bag house 43.

I claim:

1. The combination of an induction furnace having a furnace chamber providing an enclosed annular furnace cavity disposed with its axis vertical and heating means disposed axially with respect to the cavity and suitable to heat the contents of the cavity inductively, vapour treatment apparatus adapted to convert vaporous material into an industrial product, a conduit connecting the upper part of the cavity with the treatment apparatus; the furnace chamber being sufficiently fluid-tight to withstand the internal pressure necessary to drive matter in the gaseous phase from the cavity into the treatment apparatus; a feed vessel suitable to hold material in the liquid phase, a passage connecting the vessel with the furnace cavity and positioned to communicate with each at a low level which is below the level of their liquid content; a melting pot suitable to receive solid material and electrical heating means associated with the pot to convert the material in it to liquid phase, and having discharge means above the feed vessel for material melted therein to flow gravitationally into the feed vessel.

2. The combination claimed in claim 1 including an internal overflow pipe in the melting pot, the discharge end of which is arranged above the feed vessel to deliver the overflow into it.

3. The combination claimed in claim 1 in which the melting pot has an open top.

4. The combination claimed in claim 1 in which the heating means for the pot is distinct from the inductive heating means for the furnace, and including heating means associated with the feed vessel.

5. The combination claimed in claim 4 including means to adjust the rate at which electrical heat energy is supplied to the pot.

DAVID R. BEAN.

REFERENCES CITED

The following references are of record in the file of this patent:

UNITED STATES PATENTS

| Number | Name | Date |
|---|---|---|
| 800,857 | Kjellin | Oct. 3, 1905 |
| 938,752 | Frick | Nov. 2, 1909 |
| 1,218,151 | Wright | Mar. 6, 1917 |
| 2,227,069 | Reid | May 22, 1917 |
| 1,515,967 | Reagan | Nov. 18, 1924 |
| 1,818,812 | Musso | Aug. 11, 1931 |
| 2,122,241 | Arnold | June 28, 1938 |
| 2,365,346 | Kruh | Dec. 19, 1944 |